US005740163A

United States Patent [19]
Herve

[11] Patent Number: 5,740,163
[45] Date of Patent: Apr. 14, 1998

[54] DUAL-MODE ISDN/STN VIDEO TELEPHONY TERMINAL

[75] Inventor: Philippe Herve, Thorigne-Fouillard, France

[73] Assignee: Thomson-CSF, Paris, France

[21] Appl. No.: 628,730

[22] PCT Filed: Oct. 21, 1994

[86] PCT No.: PCT/FR94/01230

§ 371 Date: Jul. 23, 1996

§ 102(e) Date: Jul. 23, 1996

[87] PCT Pub. No.: WO95/12281

PCT Pub. Date: May 4, 1995

[30] Foreign Application Priority Data

Oct. 26, 1993 [FR] France .................................. 93 12755

[51] Int. Cl.[6] .................................................. H04N 7/14
[52] U.S. Cl. ........................ 370/271; 370/463; 370/465; 348/14
[58] Field of Search ................................ 348/14, 17, 15, 348/16, 348, 390; 379/142, 157, 158, 201, 202; 370/259, 260, 265, 271, 463, 465, 521, 904

[56] References Cited

U.S. PATENT DOCUMENTS

| 5,490,247 | 2/1996 | Tung et al. | 395/162 |
| 5,511,003 | 4/1996 | Agarwal | 364/514 R |
| 5,537,141 | 7/1996 | Harper et al. | 348/12 |
| 5,644,355 | 7/1997 | Koz | 348/17 |

FOREIGN PATENT DOCUMENTS

| 0495574 | 7/1992 | European Pat. Off. . |
| 0558377 | 9/1993 | European Pat. Off. . |

Primary Examiner—Benedict V. Safourek
Assistant Examiner—Ricky Ngo
Attorney, Agent, or Firm—Joseph S. Tripoli; Frederick A. Wein

[57] ABSTRACT

The disclosure concerns a dual-mode ISDN/STN visiophone terminal, including at least one audio equipment and one video equipment respectively connected to an ISDN via a dual-mode ISDN/STN audio coder/decoder incorporating an ISDN audio coder, an ISDN audio decoder, an STN audio coder and an STN audio decoder, and via a dual-mode ISDN/STN video coder/decoder incorporating an ISDN video coder, an ISDN video decoder, an STN video coder, and an STN video decoder, wherein in order to provide an answering/recording function in said visiophone terminal a RAM memory is used to store audiovisual messages in STN mode, and wherein the outputs of the ISDN audio and video decoders are connected respectively to the inputs of the STN audio and video coders in order to record in the RAM an audiovisual message sent by a calling party via a remote terminal, and wherein the outputs of the STN audio and video decoders are connected respectively to the inputs of the ISDN audio and video coders in order to send an audiovisual message, stored in the RAM, inviting said calling party to leave a message. The invention is applicable in the field of transmission and storage of audio and video data.

3 Claims, 7 Drawing Sheets

DUAL-MODE ISDN/STN VIDEO TELEPHONY TERMINAL

BACKGROUND OF THE INVENTION

The present invention concerns a dual-mode visiophone terminal for digital or switched telephone networks. Its is applicable in the field of transmission and storage of audio and video data.

DESCRIPTION OF THE PRIOR ART

Present static telephone answering/recording machines use a system of compression of the digital audio signal received in which the compressed signal is stored in RAM. The total duration or number of the messages recorded depends on the compression rate of the audio signal. Silent periods can be used to economize memory. A similar technique for images does not exist in the case of visiophone calls, which is the main reason why the present video compression standard, defined by CCITT recommendation H.261, does not provide for economic storage of video in memory.

SUMMARY OF THE INVENTION

The present invention overcomes these disadvantages.

The object of the invention is a dual-mode visiophone terminal for use on an integrated services digital network (ISDN) or a switched telephone network (STN), including at least one audio equipment and one video equipment respectively connected to an ISDN via a dual-mode ISDN/STN audio coder/decoder incorporating an ISDN audio coder, an ISDN audio decoder, an STN audio coder and an STN audio decoder, and via a dual-mode ISDN/STN video coder/decoder incorporating an ISDN video coder, an ISDN video decoder, an STN video coder, and an STN video decoder, wherein in order to provide an answering/recording function in said visiophone terminal a RAM memory is used to store audiovisual messages in STN mode, and wherein the outputs of the ISDN audio and video decoders are connected respectively to the inputs of the STN audio and video coders in order to record in the RAM an audiovisual message sent by a calling party via a remote terminal, and wherein the outputs of the STN audio and video decoders are connected respectively to the inputs of the ISDN audio and video coders in order to send an audiovisual message, stored in the RAM, inviting said calling party to leave a message.

The invention has the advantage that it enables an answering/recording function to be incorporated directly and inexpensively in a dual-mode visiophone terminal, that is capable of sending an invitation to leave a message and of receiving and storing this message in audio and video form, while optimizing the quantity of RAM required.

BRIEF DESCRIPTION OF THE DRAWINGS

The invention will be better understood and other advantages and characteristics will become clear on reading the following description making reference to the appended figures, of which.

The invention makes use of functions implemented in a dual-mode visiophone terminal that provides an entirely static answering/recording function that can record voice and images sent from the calling terminal.

Figure 1:
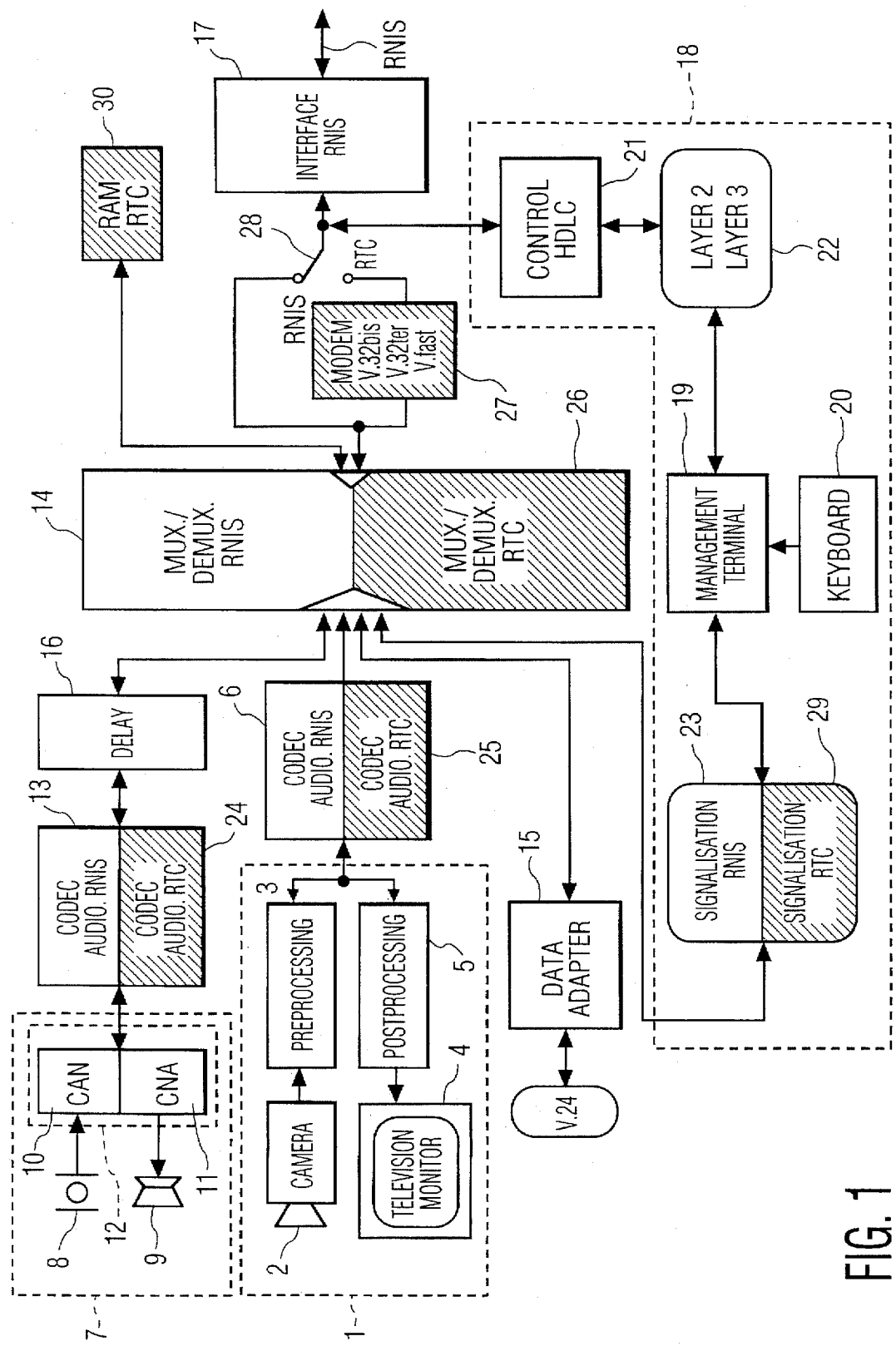
FIG. 1 is a block diagram of a dual-mode ISDN/STN visiophone terminal according to the invention.

FIG. 1 shows a block diagram of a dual-mode ISDN/STN visiophone terminal according to the invention. The terminal is connected to an ISDN line at the subscriber's physical interface S with the ISDN. It is able to communicate indifferently with a visiophone whose terminal is connected either to the ISDN or the STN. Some of its functionalities are dual-mode and its is this particularity that makes possible the dual-mode terminal according to the invention.

An ISDN visiophone terminal or visiophone includes, according to CCITT recommendation H.320, video equipment 1 (delimited by a closed discontinuous line in the figure) that includes, for example, a camera 2 with an zoom or large angle objective and a sensor making use of CCD (charge coupled device) technology, a preprocessing unit 3 that converts images to the standard CCITT format (for example, CIF: Common Intermediate Format, or QCIF: Quarter of CIF), and a color television monitor 4. This monitor 4 receives the images from a post-processing unit 5 that converts the images from received from a video coder/decoder (codec) to which the video equipment 1 is connected into displayable format. The video codec 6 includes a video coder and a video decoder performing respectively the coding and decoding of animated images at low data rate, as per CCITT recommendation H.261, this data rate ranging from about 48 Kbit/s to 112 Kbit/s.

The terminal also includes audio equipment 7 (delimited by a closed solid line in the figure) that includes at least one microphone 8 and a speaker 9 that can be mounted in the same unit.

The audio signal of the invitation message, initially analog, is converted into digital form for transmission of a visiophone message via the ISDN. After transmission, it is converted back to analog form by the receiving terminal. The analog-to-digital and digital-to-analog functions are performed respectively by a ADC (analog-to-digital converter) 10 and a DAC (digital-to-analog converter) 11 mounted in the same unit called a "cofidec" 12 (delimited by a closed hatched line in the figure) that make use of A-type and/or µ-type compression. The cofidec 12 is connected to an audio codec 13 that assures respectively the coding and decoding of an audio signal transmitted during the establishment of a visiophone call between at least two parties.

The audio coding-decoding must comply with one of the three following CCITT recommendations:

Recommendation G.711 relating to narrow band coding/decoding at 64 Kbit/s;

Recommendation G.722 relating to wider band coding/decoding at 48.56 or 64 Kbit/s;

Recommendation G.728 relating to narrow band coding/decoding at 16 Kbit/s.

An echo suppression device (not shown) can be connected to the audio equipment 7 to enable hand-free communication.

The audio and video signals and other digital data transit in the terminal via a multiplexer/demuliplexer (mux/demux) 14 in a frame structure transporting the band signaling destined for a remote terminal and complying with CCITT recommendation H.221. A data adapter 15 transforms the data flow at an interface, V.24 for example, into a bit stream that can be handled by the mux/demux 14.

A delay device 16 is connected between the audio codec 13 and the mux/demux 14 to provide temporal compensation of the video coding and decoding times which are longer than the audio coding and decoding times.

The layer 1 of the OSI (Open System Communication) model assures the physical interface 17 defined by CCITT recommendation I.430.

A management system 18 of an audiovisual call between the ISDN and the terminal connected to this network, according to CCITT recommendation H.242, is connected between the interface 17 on the terminal side and one of the inputs of the mux/demux 14 on the video codec 6 side. The management system 18 is delimited by a closed hatched line in FIG. 1. It includes a management terminal 19 equipped with a control keyboard 20, an HDLC (High Level Data Link Control) controller 21 that performs the frame generation and analysis of the network signaling information in the ISDN channel at a rate of 16 Kbit/s. This controller 21 is connected between the layer 1 of the physical interface S 17 and the layers 2 and 3, 22, of the OSI reference model. The layer 2 corresponds to the data link layer and the layer 3 corresponds to the base call procedures layer. These layers comply respectively with CCITT recommendations Q.921 and Q.931. The management system 18 also includes signaling 23 that corresponds to the procedures used to establish or stop a visiophone call according to CCITT recommendation H.242. This signaling 23 is located between the management terminal 19 and the mux/demux 14 on the video codec 6 side.

In STN mode, the visiophone terminal can be described on the basis of the preceding description in ISDN mode. The parts specifically relating the STN mode are shown by hatched lines in FIG. 1.

In STN mode, a number of functions are configured differently compared with ISDN mode because the allocate data rate is significantly lower; the coding/decoding of the audio and video signal is performed at a lower rate than in ISDN mode. The compression of video and audio signals in STN mode is not yet normalized, but the authorize data rate for a quality considered to be acceptable is around 4.8 Kbit/s for the coding/decoding of the audio signal, and in the range 8 to 20 Kbit/s for the coding/decoding of the video signal. A 4.8 Kbit/s STN audio codec 24 is associated with the ISDN codec 13, and a 8 to 20 Kbit/s STN video codec 25 is associated with the ISDN video codec 6.

Similarly, an STN H.22X mux/demux 26, not yet normalized, is associated with the ISDN mux/demux 14. A modem 27 used to modulate/demodulate a digital data stream on the STN telephone line, in conformance with the V.32bis, V32ter and Vfast CCITT standards, is connected between the ISDN/STN mux and demux, 14 and 26, and the layer 1 of the physical interface S 17 via a switch 28 used to select either ISDN or STN mode. During ISDN operation, the modem 27 is disconnected.

An STN signaling 29 includes all the procedures, used to establish or stop a visiophone call, is associated with the H.242 ISDN signaling 23. The answering/recording function of the device according to the invention is indicated in FIG. 1 only by a RAM 30, that we shall call the "message memory", for example a used to store compressed data from the mux/demux 14, 26.

FIGS. 2 to 7 are all based on functional organization shown in FIG. 1. They illustrate the routing of the various audio and video data flows in the answering/recording function according to the invention.

In these figures the parts that are identical to those in FIG. 1 carry the same reference numbers.

The ISDN audio codec 13 includes an ISDN audio coder 31, complying with CCITT recommendation G.728, and an ISDN audio decoder 32. The STN audio codec 24 includes a very low data rate (4.8 Kbit/s) STN audio coder 33 and a very low data rate (4.8 Kbit/s) STN audio decoder 34.

The ISDN video codex 6 includes an ISDN video coder 35, complying with CCITT recommendation H.261, and an ISDN video decoder 36. The STN video coder 25 includes an STN video coder 37 and a very low data rate (4.8 Kbit/s) STN video decoder 38. The mux/demux 14 includes an ISDN mux 39 and an ISDN demux 40. The STN mux/demux 26 includes an STN mux 41 and an STN demux 42.

Figure 2:
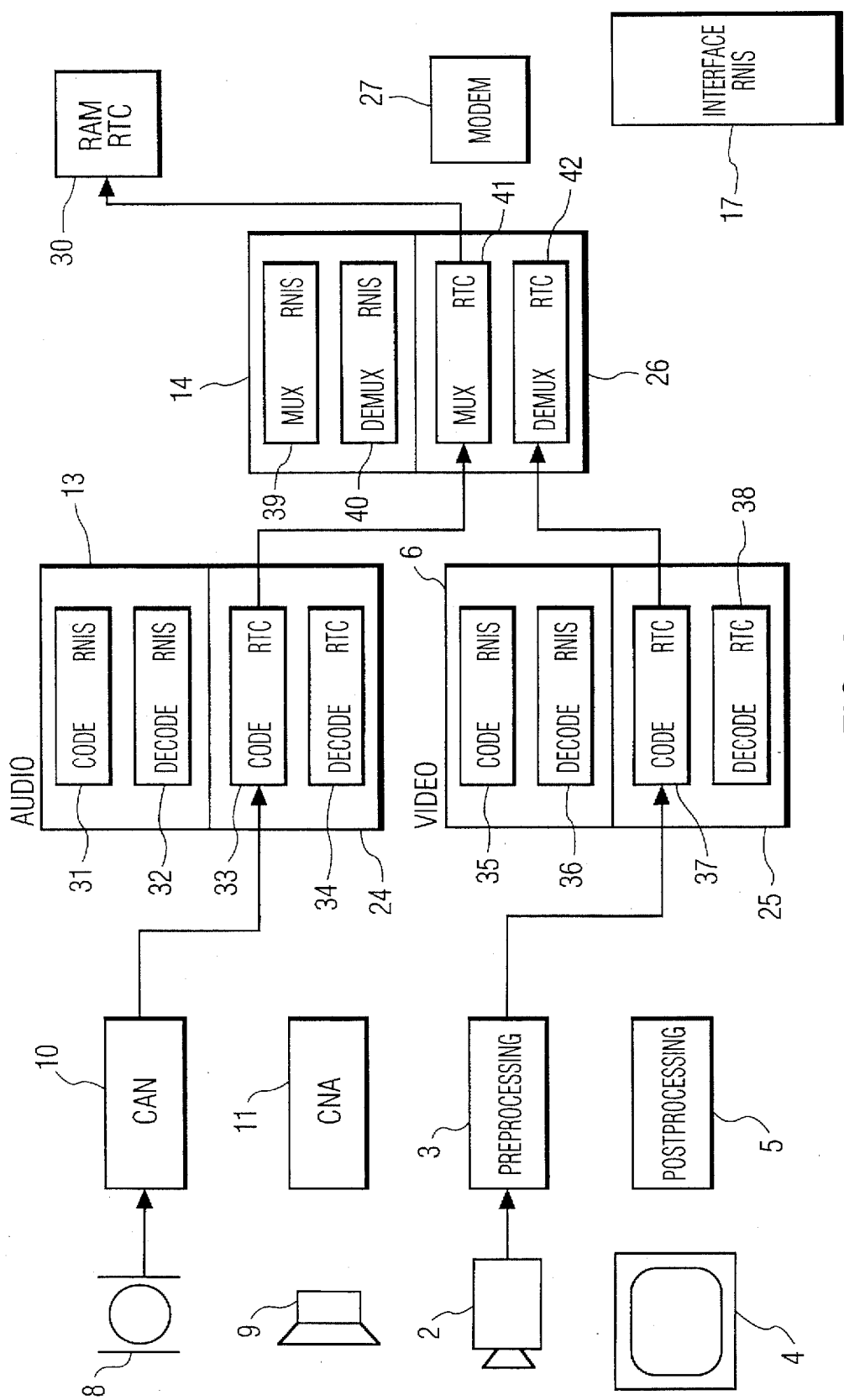
FIG. 2 shows the routing of audio and video data flows in the terminal according to the invention during the recording of a message inviting a calling party to leave a message on the answering/recording system.

FIG. 2 shows the routing of the audio and video data streams when recording an invitation message, in local STN mode, to invite callers to leave a message on the answering/recording system of the terminal according to the invention. This invitation message will be sent to the called terminal, for example after a predetermined number of ringing tones. The audio recording is carried out via a microphone 8 and the ADC 10 of the audio unit 7, the output of the ADC 10 is fed to the input of the very low data rate (4.8 Kbit/s) STN coder 33. The output from the coder 33 is connected to a first input of the STN multiplexer 41 (input for the audio signal). The video recording is carried out via the camera 2 and the video image preprocessing module 3. The output of the pre-processing device 3 is connected to the input of the low data rate STN video coder 37. The output of the coder 37 is connected to the second input of the STN mux 41 (input for the video signal). The output of the STN mux 41 is connected to the input of the message memory 30.

Figure 3:
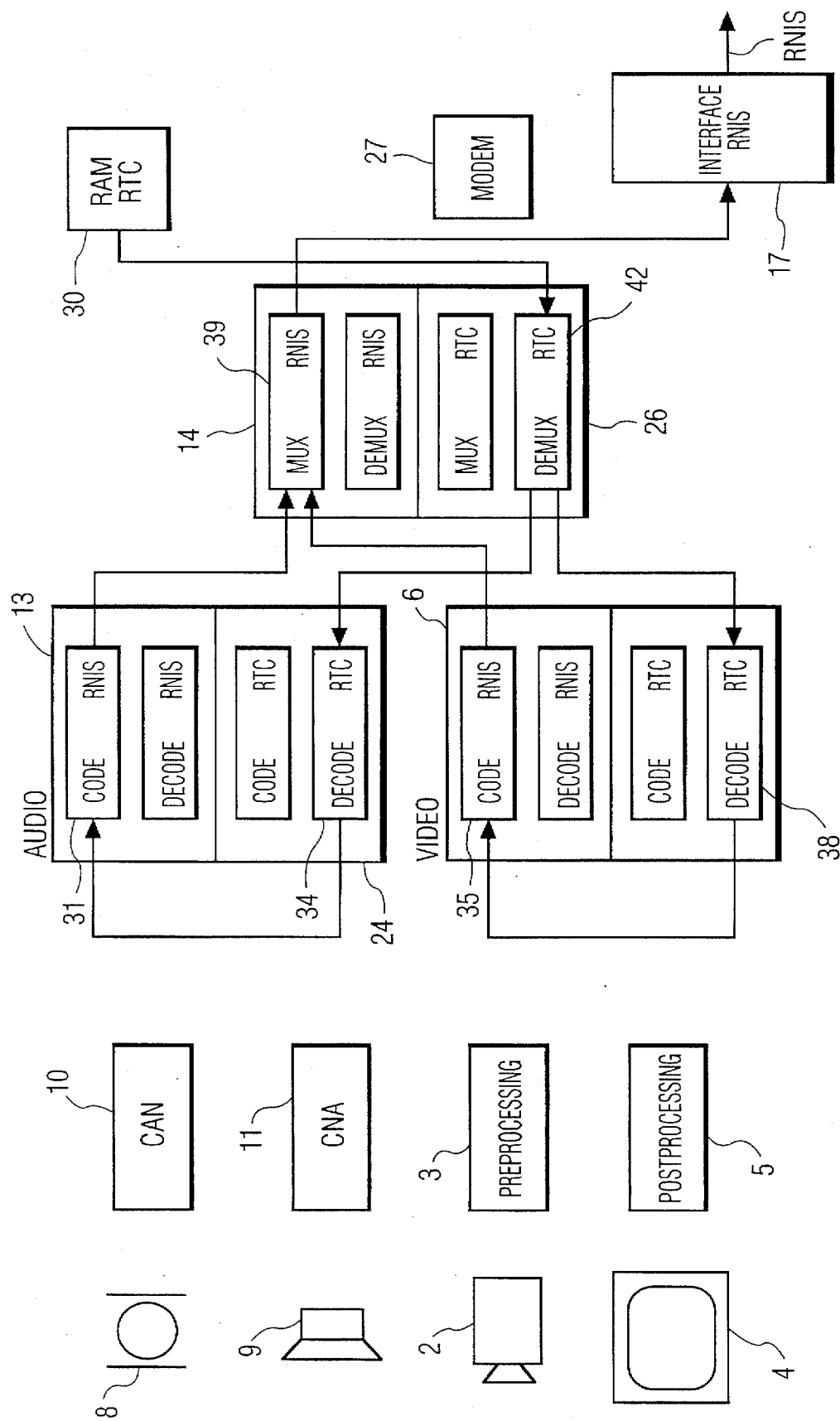
FIG. 3 shows the routing of audio and video data flows during the transmission of the invitation message following a call via the ISDN.

FIG. 3 shows the routing of the audio and video data streams when sending an invitation message in response to a call from an ISDN visiophone terminal. The invitation message stored in the message memory 30 is sent to the input of the STN demux 42. A first output (audio signal) is connected to the very low data rate (4.8 Kbit/s) STN audio decoder 34. The output of the decoder 34 is connected to the input of the ISDN audio coder 31 and the output of the coder 31 is connected to a first input of the ISDN mux 39 (audio signal input). A second output of the STN demux 42 (video signal output) is connected to the input of the very low data rate (4.8 Kbit/s) STN video decoder 38. The output of the decoder 38 is connected to the input of the ISDN video coder 35. The output of the coder 35 is connected to a second input of the ISDN mux 39 (video signal input). The invitation message at the output of the ISDN mux 39 is then sent via the network interface 17 and the ISDN to the calling terminal.

The outputs of the STN audio decoder 34 and video decoder 38 are connected respectively to the inputs of the ISDN audio decoder 31 and video decoder 35 and it is impossible to add information to improve the quality of images by the ISDN coding. However, it is necessary to avoid causing any supplementary degradation.

The data from the output of the ISDN audio coder 31 and video coder 35 are destined to be sent from the called terminal to a remote calling terminal. The tolerance to transmission errors can be improved by increasing the number of blocks coded in intra mode, since the data rate would allow this.

Figure 4:
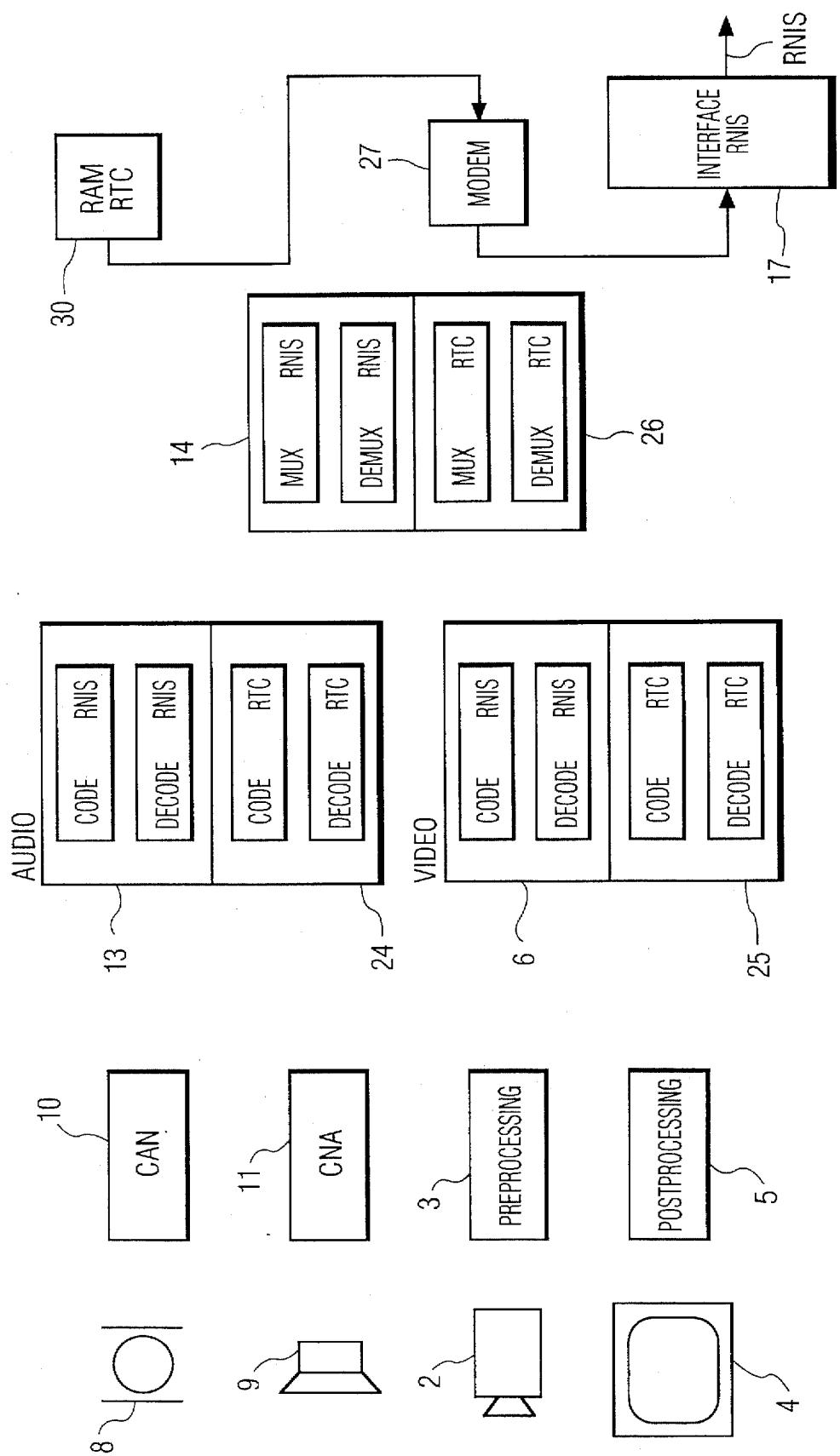
FIG. 4 shows the routing of audio and video data flows during the transmission of the invitation message following a call via the STN.

FIG. 4 shows the routing of the audio and video data streams when sending an invitation message in response to a call from an STN visiophone terminal. The audiovisual message stored in the message memory 30 in STN mode is fed to the input of the modem 27. The output from this modem 27 is connected to the input of the network interface 17. The audiovisual signal at the output of the network interface is in STN mode and transported physically by the ISDN. The only mode used in this configuration being STN mode, only the message memory 30, the modem 27 and the interface 17 are used.

Figure 5:
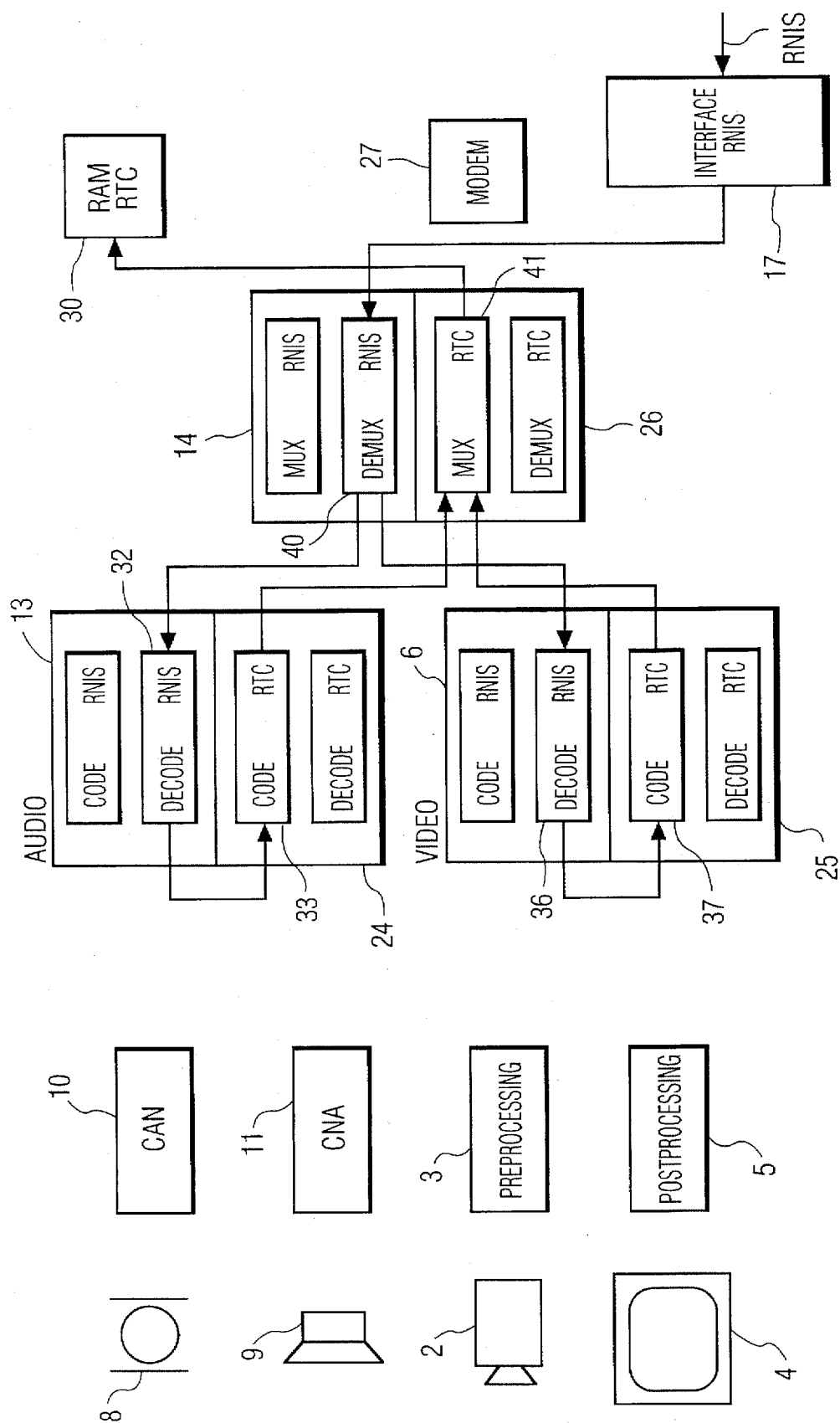
FIG. 5 shows the routing of audio and video data flows during the recording of a message sent from a remote ISDN terminal to the answering/recording system of the terminal according to the invention.

FIG. 5 shows the routing of the audio and video data streams when recording a message sent from a visiophone terminal in ISDN mode to the answering/recording system of the called terminal according to the invention. The audiovisual message transported via ISDN is fed to the input of the network interface 17. The output of the interface 17 is connected to the input of the ISDN demux 40. A first output of the demux 40 (video signal output) is connected to the input of the ISDN video decoder 36. The output of the decoder 36 is connected to the input of the very low data rate (4.8 Kbit/s)STN video coder 37. The output of the coder 37 is connected to a first input of the STN mux 41 (video signal input). The second output of the ISDN demux (audio signal output) is fed to the input of the ISDN audio decoder 32. The output of the decoder 32 is connected to the input of the very low data rate (4.8 Kbit/s) STN audio coder 33. The output of this coder 33 is connected to the second input of the STN mux 41 (audio signal input), the audiovisual message left by the caller via his ISDN visiophone terminal being delivered at the output of the STN mux 41 and then memorized in the message memory 30 in STN mode.

The outputs of the ISDN audio and video decoders, 32 and 36, are connected respectively to the inputs of the very low data rate STN audio and video coders, 33 and 37. These ISDN audio and video decoders, 32 and 36, can constitute a pre-analysis stage for the STN coders, 33 and 37. The intermediate video signal undergoes a supplementary compression, i.e. a reduction of the quantity of data representing the video signal. Therefore it is possible to optimize the quality of this second compression by making use of certain parameters provided by the decoder 36. Three of the main ones are mentioned below:

A first parameter is the quantification step used by the decoder 36. Quantification introduces an error in the reconstituted signal at the output of the decoder 36. The coder 37 connected to the decoder 36 can take into account this parameter in order to optimize the number of bits assigned to an image block, by using a more precise quantification of the error signal resulting from the first coding/decoding operation, a minimum quantification step being determined for each image block.

As second parameter if the movement field. For the STN coding at very low data rate, the cost (i.e. the number of bits generated by the movement vectors) may prove to be high relative to the number of bits available per image. The field is generally made uniform so as to minimize the cost of differential transmission. The vectors obtained from the decoding are important data used in a smoothing algorithm of the movement field.

A third parameter is related to the coding modes extracted from the decoder. Analysis of the coding modes enables a classification into fixed zones, corresponding to image blocks that have been decoded in inter mode without coefficient and without movement compensation, and animated zones corresponding to image blocks that have been decoded in inter mode with coefficients and movement compensation. This analysis enables the quantity of data assigned to each part of the image to be coded to be determined intelligently and a priori, to provide optimize quality and regulation of the data flows.

Figure 6:
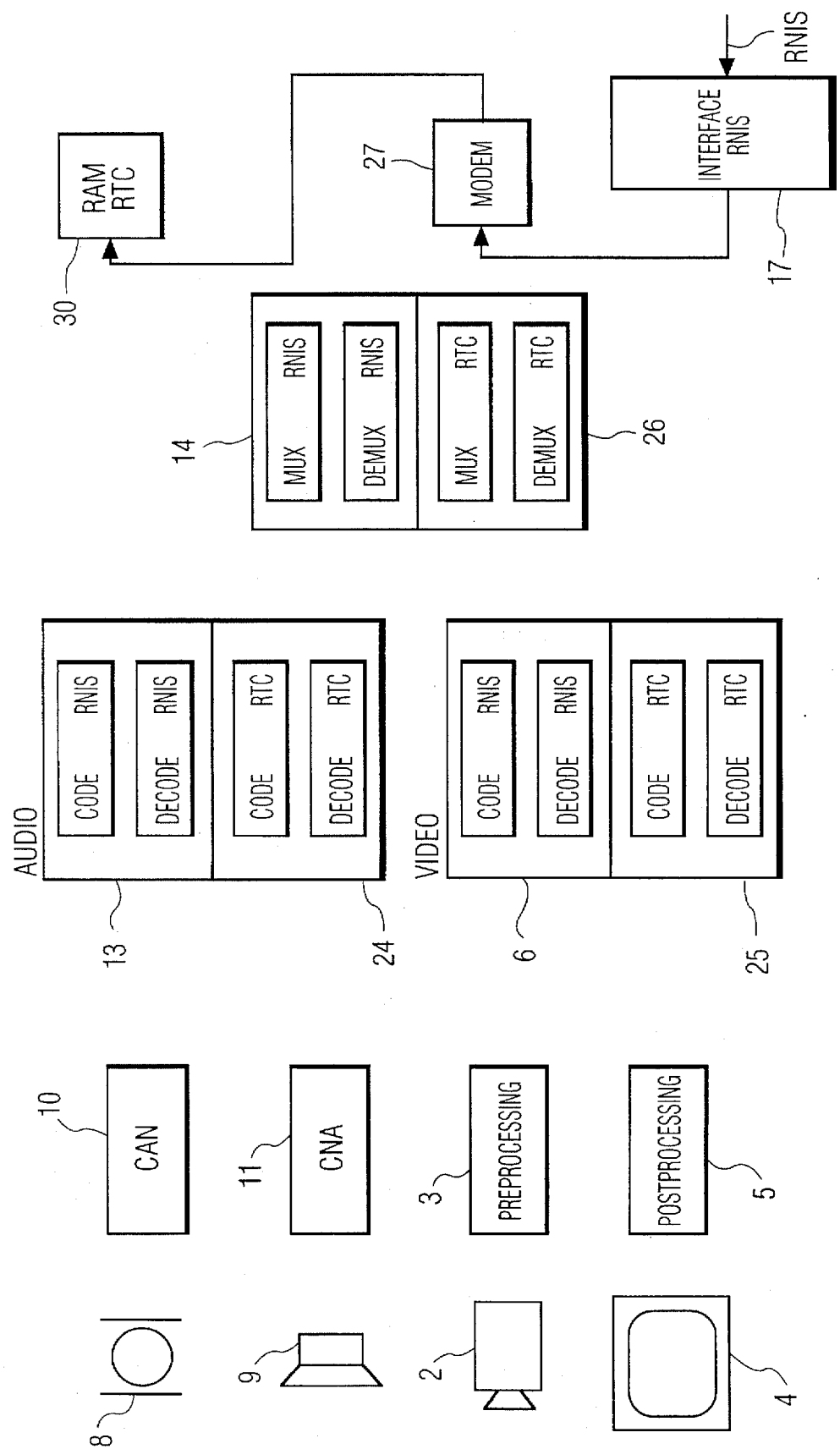
FIG. 6 shows the routing of audio and video data flows during the recording of a message sent from a remote STN terminal to the answering/recording system of the terminal according to the invention.

FIG. 6 shows the routing of the audio and video data streams when recording a message sent from a visiophone terminal in STN mode, or by a telephone, on the answering/recording system of the called terminal according to the invention. The audiovisual message from the calling STN terminal or telephone is sent via the ISDN to the input of the network interface 17. The output of the interface 17 is connected to the input of the modem 27. The output of the modem is connected to the input of the message memory 30.

Figure 7:
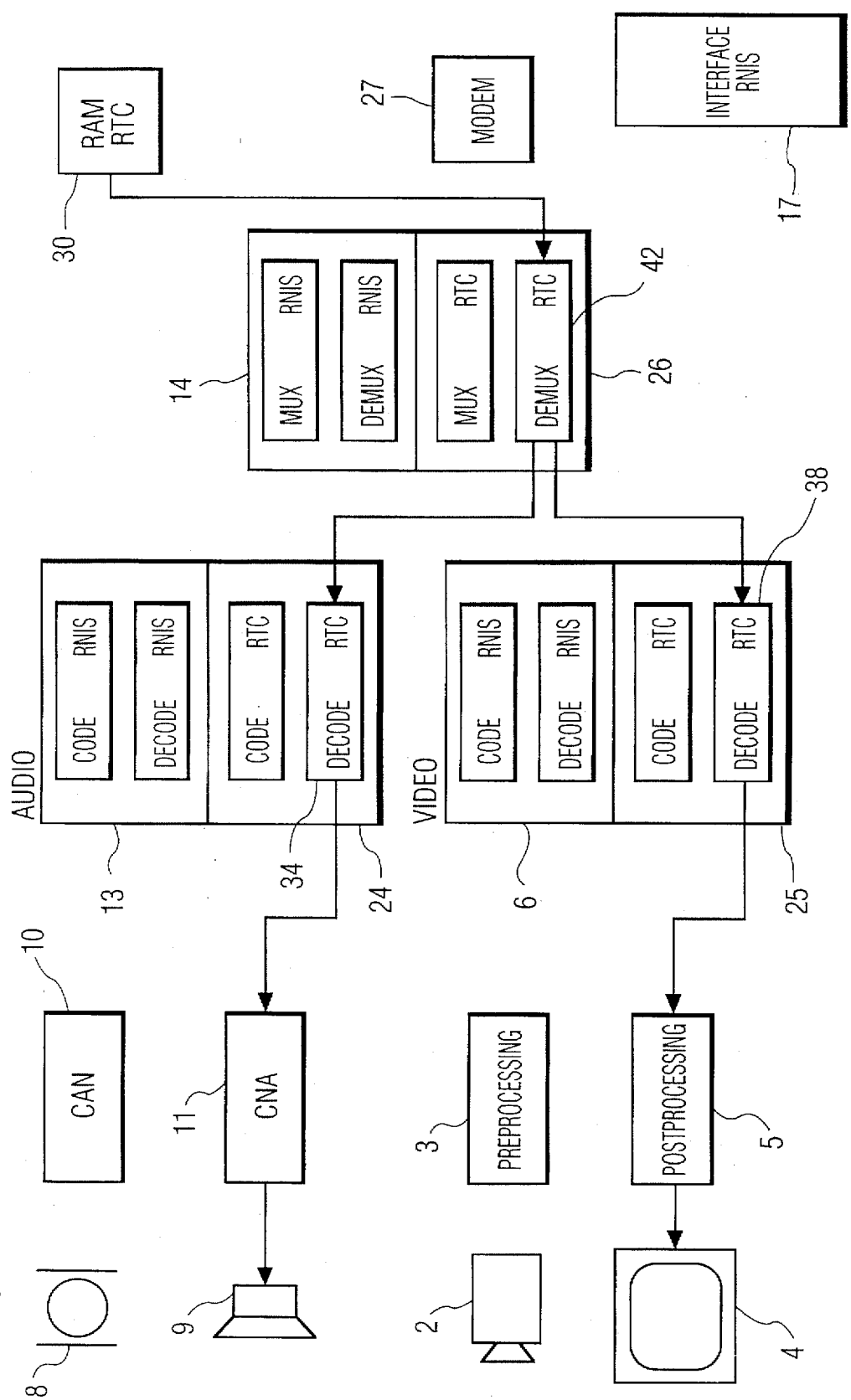
FIG. 7 shows the routing of audio and video data flows during the reading of messages recorded on the answering/recording system of the terminal according to the invention.

FIG. 7 shows the routing of the audio and video data streams when reading recorded messages, whatever their origin, stored in the message memory 30. The memorized message is fed to the input of the STN demux 42. A first output of the demux (video signal output) is connected to the input of the very low data rate (4.8 Kbit/s) STN video decoder 38. The output of the decoder 38 is connected to the input of the post-processing device 5. The output of this processing device 5 is connected to the input of the display terminal 4. A second output of the STN demux 42 (audio signal output) is connected to the input of a 4.8 Kbit/s STN audio decoder 34. The output of the decoder 34 is connected to the input of the digital-to-analog converter 11. The analog audio signal at the output of this converter 11 is fed to the speaker 9.

We can make a quantitative estimate of the memory capacity required by the terminal according to the invention to implement the answering/recording function, as a function of the length of the messages recorded in the message memory:

For a (compressed) audio data rate of 4.8 Kbit/s and a (compressed) video data rate of 11 Kbit/s in STN mode, a minimum rate of 16 Kbit/s is necessary for data storage. So the memory capacities required are as follows:

1 megabits for 64 seconds, 4 megabits for 4,2 minutes, 16 megabits for 17 minutes.

The memories used are relatively slow memories, i.e. having relatively long access times. However, the memories must be capable of being refreshed even during power failures or micro-failures, if no part of the messages is to be lost.

In addition to using low-cost memory components, the invention has other advantages:

Access to any of the messages stored in the message memory 30 is totally random, which enables the user to scan the messages very rapidly backwards or forwards. A central microprocessor can preserve the parameters of a message received, such as its duration, and its date and time of arrival.

The fact that the terminal is connected to the ISDN enables certain functions of the network to be exploited, such as caller identification, message filtering, sorting of messages by priority, etc.

Considerable latency can be allowed in the video compression, which is not the case in an interactive conversation in which delays are important. This enables the audiovisual data flow to be better regulated and therefore a better image to be obtained.

If the remote calling terminal is a telephone, the answering function of the visiophone terminal according to the invention then behaves like a simple audio answering/recording machine.

What is claimed is:

1. Dual-mode visiophone terminal for use on an integrated services digital network (ISDN) or a switched telephone network (STN), including at least one audio equipment and one video equipment respectively connected to an ISDN via a dual-mode ISDN/STN audio coder/decoder incorporating an ISDN audio coder, an ISDN audio decoder, an STN audio coder and an STN audio decoder, and via a dual-mode ISDN/STN video coder/decoder incorporating an ISDN video coder, an ISDN video decoder, an STN video coder, and an STN video decoder, wherein in order to provide an answering/recording function in said visiophone terminal a RAM memory is used to store audiovisual messages in STN mode, and wherein the outputs of the ISDN audio and video decoders are connected respectively to the inputs of the STN audio and video coders in order to record in the RAM an audiovisual message sent by a calling party via a remote terminal, and wherein the outputs of the STN audio and video decoders are connected respectively to the inputs of the ISDN audio and video coders in order to send an audiovisual message, stored in the RAM, inviting said calling party to leave a message.

2. Dual-mode ISDN/STN visiophone terminal according to claim 1, that also includes a dual-mode ISDN/STN multiplexer/demultiplexer, to multiplex the digital data of different types transiting the said terminal, that is connected to dual-mode ISDN/STN audio and video coders/decoders, to a physical interface between the said terminal and the ISDN, to a modem functioning in STN mode, and to means for setting up a visiophone call between said visiophone terminal and at least one remote calling terminal connected to the same ISDN.

3. Dual-mode ISDN/STN visiophone terminal according to claim 1, wherein said ISDN audio and video decoders constitute respectively a pre-analysis stage for said STN audio and video coders, enabling the quantity of information in the video signal to be reduced.

* * * * *